Patented Aug. 29, 1933

1,924,762

UNITED STATES PATENT OFFICE 1,924,762

PREPARATION OF CARBOXYLIC ACIDS

John C. Woodhouse, Wilmington, Del., assignor to E. I. du Pont de Nemours & Company, Wilmington, Del., a corporation of Delaware No Drawing. Application November 11, 1932
Serial No. 642,233

18 Claims. (Cl. 260—116)

This invention relates to the synthesis of organic compounds and particularly to the preparation of higher aliphatic acids by the interaction of olefines, carbon monoxide, and steam.

In the copending application of Gilbert B. Carpenter Ser. No. 559,130, a process is described for the preparation of aliphatic carboxylic acids of the higher order by the reaction of steam, carbon monoxide, and an olefinic hydrocarbon, i. e. an aliphatic hydrocarbon containing a double bond,—for example, the olefines ethylene, propylene, butylene, etc.,—the synthesis producing from these olefines propionic, butyric, and valeric acids respectively,—the diolefines likewise may be similarly treated to give e. g. from isopyrene, trimethyl succinic acid, and from 1.4 penta diene symmetrical dimethyl glutaric acid.

An object of the present invention is to provide a process for the preparation of aliphatic carboxylic acids from steam, carbon monoxide, and olefinic hydrocarbons. A further object of this invention is to provide a process for the preparation of monocarboxylic acids from steam, carbon monoxide and an olefine in the presence of a volatile inorganic acid and in the presence or absence of an absorbent material such as pumice, silica gel, active carbon, etc. A still further object of the invention is to provide a process for the preparation of organic compounds by reacting an olefine, steam, and carbon monoxide with a halogen as the catalyst. Another object of the invention is to provide a process for the preparation of acids having the structural formula—

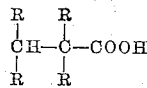

from steam, carbon monoxide, and an olefinic hydrocarbon, the R indicating hydrogen or a substituted or unsubstituted similar or dissimilar alkyl or aralkyl grouping. Other objects and advantages will hereinafter appear.

In accord with the present invention aliphatic carboxylic acids can be prepared from steam, carbon monoxide, and an olefinic hydrocarbon by passing these constituents, preferably with a halogen, for example, chlorine, under suitable temperature and pressure conditions, over an absorbent material such as pumice, silica gel, active carbon, and more particularly over activated charcoal. In lieu of the halogens I may use the non-metals sulfur, tellurium, phosphorus, etc., or any compound which is volatile under the temperature of the reaction and which hydrolyzes or otherwise reacts with the water or other gaseous reactant present to give an inorganic acid. The halogens such as chlorine, with steam, give hydrogen chloride and hydrogen oxychloride; the other non-metals giving, according to their nature, and the conditions of the reaction, oxygenated or non-oxygenated acids. The products resulting from such a reaction will contain generally a mixture of aliphatic carboxylic acids some of which have a greater, some a lesser, number of carbon atoms than are present in the olefine treated,—an aliphatic acid containing one more carbon atom than the olefine treated usually predominating.

My preferred class of catalysts are the halogens, chlorine, bromine, iodine, and fluorine; chlorine being the preferred halogen. Other catalysts, which are suitable, include the non-metals which react with water to form acid, e. g. sulfur, tellurium, phosphorus, and other compounds, organic or inorganic, which in the presence of steam or other reactants and the conditions of the reaction form acids. Compounds coming under this heading include the volatile halogen compounds such as ammonium chloride, carbon tetra-chloride, methyl, ethyl, and the other alkyl halides, the aromatic halides, benzyl chloride, tolyl chloride, methyl, ethyl and the other mercaptans, methyl phosphine, methyl nitrate, ethyl hydroselenide, sulfuryl chloride, antimony chloride, chromyl chloride, manganese perchloride, etc. In fact, any compound or element, volatile at the temperature of the reaction, in order that it may be injected into the reaction zone in the vapor phase, and which will form an acid when present therein, are suitable. It is understood, however, that for uniformly high yields and best overall operating conditions I prefer to use the halogens and of the halogens chlorine, due to its availability and excellent operating characteristics.

Raw materials suitable for use in the process are readily available from a number of sources. Thus, ethylene and various homologues thereof are found in the gases evolved in cracking petroleum and may be separated therefrom, for example, by fractional liquefaction. It is preferable, for the sake of making a single pure product, that the hydrocarbon which it is desired to convert be employed in a relatively high degree of purity.

The carbon monoxide required for the synthesis may conveniently be derived from various commercial sources, such as, for example, water-gas, producer gas, carbide preparation, etc., by liquefaction or other methods, and should likewise for the best results be relatively pure.

The relative proportions of the reactants can be varied altho it has been found that very advantageous results can be obtained when the steam and carbon monoxide are in excess with respect to the olefinic hydrocarbon. Concentrations of the latter within the range of from 1½ to 10% by volume of the total reactants have been employed with good results.

The use of pressures in excess of atmospheric, say from 25 to 100 atmospheres, is preferred. The reaction proceeds over a wide range of temperatures, altho the optimum temperature varies with specific cases, depending inter alia upon the hydrocarbon being used. Generally, the desired reaction can be obtained at from 200° to 400° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 275° to 375° C.

The following examples will illustrate methods of practising the invention, altho the invention is not limited to the examples:

*Example 1.*—A gaseous mixture was prepared containing by volume 95% carbon monoxide and 5% ethylene, together with steam to give a steam : carbon monoxide and ethylene ratio of approximately 0.25. Into this mixture is injected an appropriate amount of chlorine to give a gaseous mixture containing approximately 0.25% of this catalyst. The resulting gaseous mixture is passed into a conversion chamber designed for carrying out exothermic gaseous reactions and in which activated charcoal is disposed. The temperature of the reaction is maintained at approximately 325° C. while the pressure is held at approximately 700 atmospheres. A good yield of propionic acid has been obtained together with other aliphatic acids when operating under these conditions.

*Example 2.*—A gaseous mixture containing by volume 94% carbon monoxide, 5% propylene, and .125% carbon tetrachloride, together with steam, to give a steam : carbon monoxide and propylene ratio of approximately .25, is passed into a conversion chamber designed for carrying out gaseous exothermic reactions and in which activated charcoal has been disposed. At a temperature of approximately 325° C. and a pressure of 700 atmospheres a good yield of iso-butyric acid is obtained.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, copper, manganese, or nickel.

Various changes may be made in the method described hereinbefore without departing from the invention or sacrificing the advantages thereof.

I claim:

1. A process for the preparation of aliphatic carboxylic acids from steam, carbon monoxide, and an olefinic hydrocarbon, which includes the step of effecting the reaction in the presence of a volatile inorganic acid.

2. A process for the preparation of aliphatic carboxylic acids from steam, carbon monoxide, and an olefinic hydrocarbon, which includes the step of effecting the reaction in the presence of a volatile inorganic acid formed in situ.

3. A process for the preparation of aliphatic carboxylic acids from steam, carbon monoxide, and an olefinic hydrocarbon, which includes the step of effecting the reaction in the presence of a volatile inorganic acid, formed in situ, and an absorbent material.

4. A process for the preparation of aliphatic carboxylic acids from steam, carbon monoxide, and an olefinic hydrocarbon, which includes the step of effecting the reaction in the presence of a volatile inorganic acid, formed in situ, and active carbon.

5. A process for the preparation of aliphatic carboxylic acids from a gaseous mixture containing steam, carbon monoxide, and an olefinic hydrocarbon, which includes the step of passing into the reaction the gaseous mixture together with a catalyst, the catalyst existing in the vapor phase at the temperature of the reaction and reacting with the gaseous mixture to form a volatile inorganic acid.

6. A process for the preparation of aliphatic carboxylic acids from a gaseous mixture containing steam, carbon monoxide, and an olefinic hydrocarbon, which includes the step of passing the gaseous mixture together with a catalyst, which is in the vapor phase at the temperature of the reaction and which reacts with the steam to form a volatile inorganic acid, over an absorbent material.

7. A process for the preparation of aliphatic carboxylic acids from a gaseous mixture containing steam, carbon monoxide, and an olefinic hydrocarbon, which includes the step of passing the gaseous mixture together with a catalyst, which is in the vapor phase at the temperature of the reaction and which reacts with the steam to form a volatile inorganic acid, over active carbon.

8. A process for the preparation of aliphatic carboxylic acids from a gaseous mixture containing steam, carbon monoxide, and an olefinic hydrocarbon, which includes the step of passing into the reaction the gaseous mixture together with a halogen which acts as the catalyst for the reaction.

9. A process for the preparation of aliphatic carboxylic acids from a gaseous mixture containing steam, carbon monoxide, and an olefinic hydrocarbon, which includes the step of passing the gaseous mixture together with a halogen, as a catalyst for the reaction, over an absorbent material.

10. A process for the preparation of aliphatic carboxylic acids from a gaseous mixture containing steam, carbon monoxide, and an olefinic hydrocarbon, which includes the step of passing the gaseous mixture together with a halogen as a catalyst for the reaction over active carbon.

11. A process for the preparation of aliphatic carboxylic acids from a gaseous mixture containing steam, carbon monoxide, and an olefinic hydrocarbon, which includes the step of effecting the reaction in the presence of chlorine as a catalyst therefor.

12. A process for the preparation of aliphatic carboxylic acid from a gaseous mixture containing steam, carbon monoxide, and an olefinic hydrocarbon, which includes the step of passing the gaseous mixture together with chlorine over activated charcoal.

13. A process for the preparation of propionic acid from a gaseous mixture containing steam, carbon monoxide, and ethylene, which includes the step of passing the gaseous mixture together with chlorine over activated charcoal.

14. A process for the preparation of a butyric acid from a gaseous mixture containing steam, carbon monoxide, and propylene, which includes the step of passing the gaseous mixture together with chlorine over activated charcoal.

15. A process for the preparation of a valeric acid from steam, carbon monoxide, and butylene, which includes the step of passing the gaseous mixture together with chlorine over activated charcoal.

16. A process for the preparation of aliphatic carboxylic acids from steam, carbon monoxide, and an olefine, which includes the step of effecting the reaction in the presence of a volatile inorganic acid formed in situ.

17. A process for the preparation of aliphatic carboxylic acids from steam, carbon monoxide, and an olefine, which includes the step of effecting the reaction in the presence of a volatile inorganic acid, formed in situ, and active carbon.

18. A process for the preparation of aliphatic carboxylic acids from a gaseous mixture containing steam, carbon monoxide, and an olefinic hydrocarbon, which includes the step of passing into the reaction the gaseous mixture containing a non-metal which acts as the catalyst for the reaction.

JOHN C. WOODHOUSE.